United States Patent [19]

Fujimoto et al.

[11] Patent Number: 5,768,949

[45] Date of Patent: Jun. 23, 1998

[54] INTEGRAL CAST FLYWHEEL AND METHOD OF PRODUCING THE SAME

[75] Inventors: Hiroya Fujimoto, Zushi; Takaya Fujita, Yamato, both of Japan

[73] Assignee: Nissan Motor Co., Ltd., Yokohama, Japan

[21] Appl. No.: 654,963

[22] Filed: May 29, 1996

[30] Foreign Application Priority Data

May 31, 1995 [JP] Japan .................................. 7-133897
Jan. 19, 1996 [JP] Japan .................................. 8-007366

[51] Int. Cl.$^6$ ............................ F16F 15/10; G05G 1/00
[52] U.S. Cl. ........................ 74/572; 74/574; 29/888.01
[58] Field of Search ...................... 74/572–574; 29/463; 464/24, 68; 192/55.1, 55.3, 55.4, 55.61

[56] References Cited

U.S. PATENT DOCUMENTS

| | | | |
|---|---|---|---|
| 2,756,488 | 7/1956 | Stevens | 29/183.5 |
| 3,323,620 | 6/1967 | Klauer et al. | 188/218 |
| 3,500,972 | 3/1970 | Talmage | 188/218 |
| 4,020,937 | 5/1977 | Winter | 192/107 R |
| 4,262,552 | 4/1981 | Honda | 74/572 |
| 4,828,533 | 5/1989 | Focqueur et al. | 464/24 |
| 5,601,002 | 2/1997 | Lucienne | 74/574 |

FOREIGN PATENT DOCUMENTS

| | | |
|---|---|---|
| 27 42 714 | 9/1977 | Germany . |
| 8-82345 | 3/1996 | Japan . |
| 2 114 709 | 7/1983 | United Kingdom . |

OTHER PUBLICATIONS

Nissan New Model Maintenance Manual, p. B–13, (1992).

Primary Examiner—Vinh T. Luong
Attorney, Agent, or Firm—Foley & Lardner

[57] ABSTRACT

An integral cast flywheel comprises a circular center flange portion, an annular mass portion concentric with the center flange portion, and an annular plate portion concentrically interposed between the center flange portion and the mass portion. Between the plate portion and the mass portion, there is defined an annular cavity which has an annular opening directed radially inward. The annular cavity is concentric with the center flange portion.

18 Claims, 7 Drawing Sheets

100A

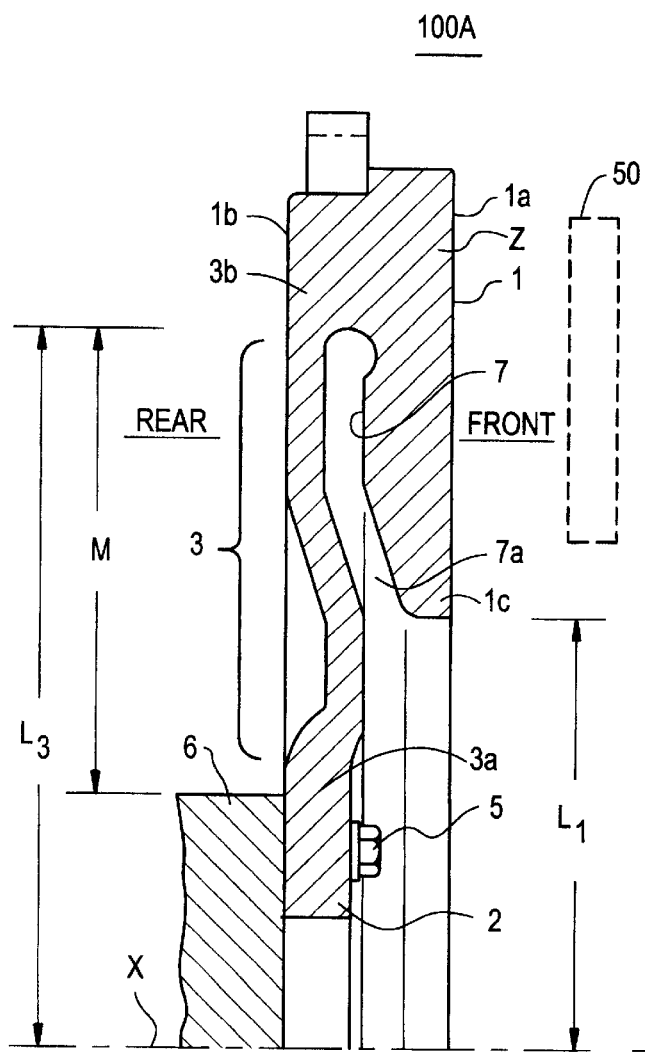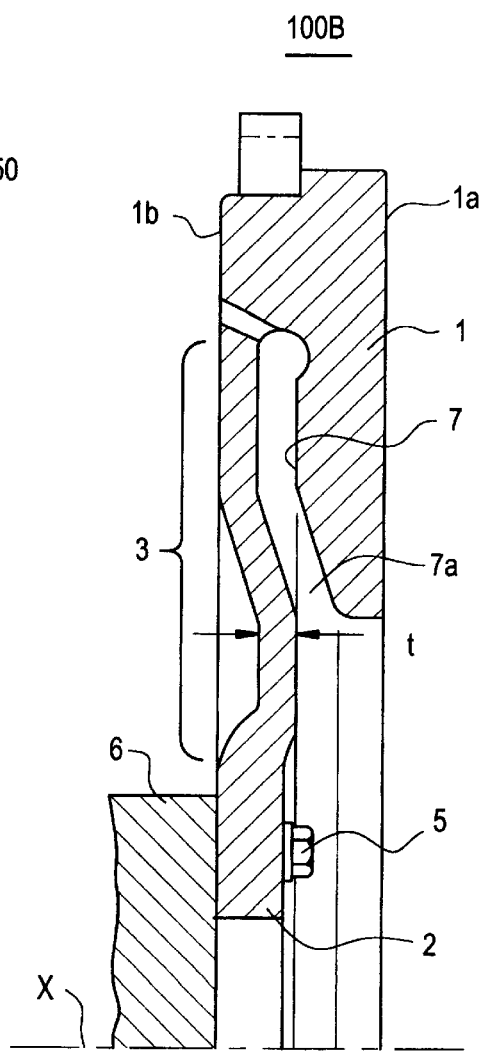

100D

100E

FIG.10
FIG.11
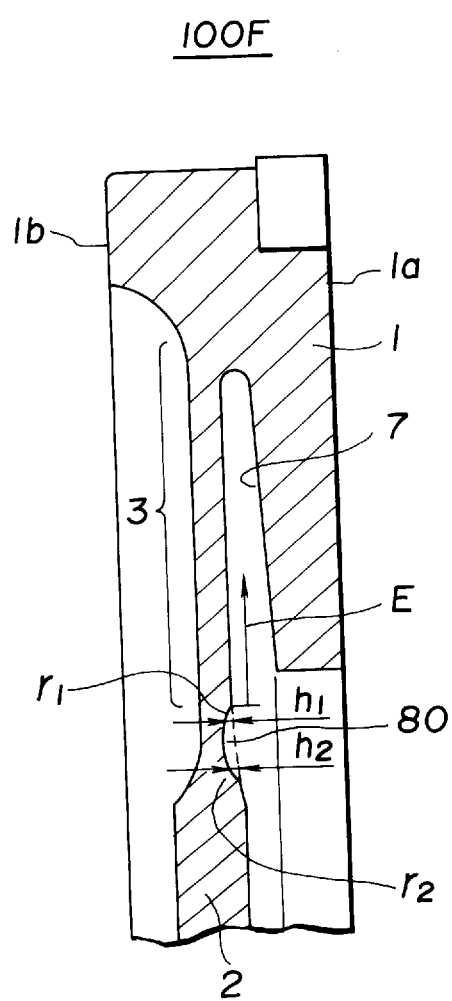
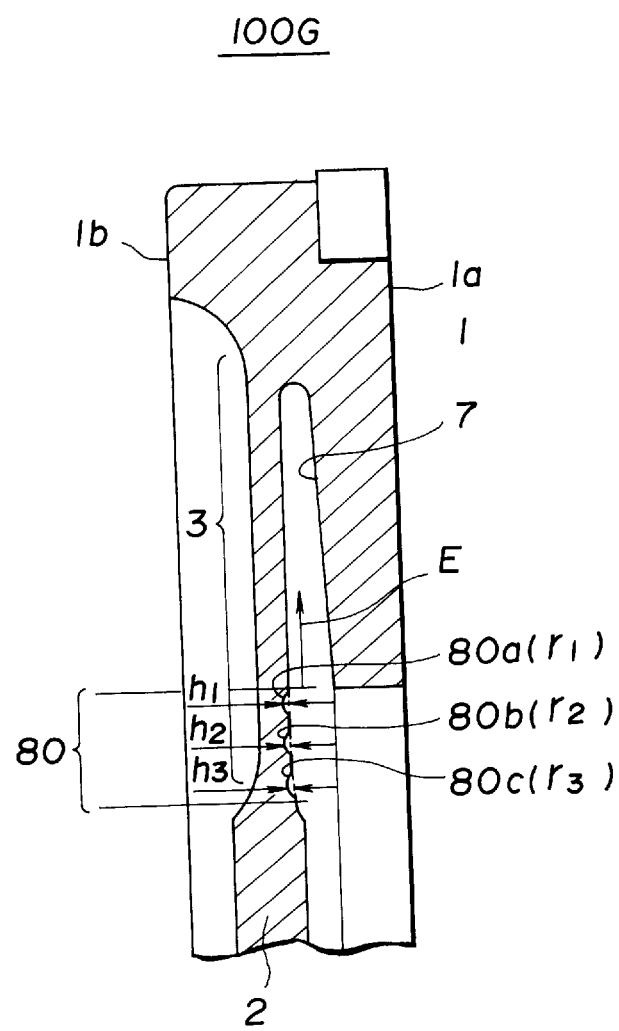

INTEGRAL CAST FLYWHEEL AND METHOD OF PRODUCING THE SAME

BACKGROUND OF THE INVENTION

1. Field of the Invention

The present invention relates in general to flywheels for an internal combustion engine, and more particularly to flywheels of a type which is constructed of a reduced number of parts. More specifically, the present invention is concerned with an integral cast flywheel and a method of producing the same, which flywheel is constructed to have a marked fatigue strength.

2. Description of the Prior Art

In order to clarify the task of the present invention, some of conventional flywheels for an internal combustion engine will be briefly described with reference to the accompanying drawings.

Referring to FIG. 12 of the drawings, there is shown a conventional flywheel for an internal combustion engine, which is disclosed in the publication "NISSAN NEW MODEL MAINTENANCE MANUAL (page B-13)" published in 1992.

The flywheel is of a flexural vibration damping type, which generally comprises an annular mass portion 1, an annular mounting flange portion 2, and a resiliently flexible annular plate portion 3 which permits a flexural displacement of the mass portion 1 relative to the flange portion 2. The mass portion 1 is secured to the plate portion 3 by bolts 4, and both the flange portion 2 and the plate portion 3 are connected to an end of a crankshaft 6 by bolts 5, as shown. The mass portion 1, the flange portion 2 and the plate portion 3 are concentrically arranged.

Due to the above-mentioned structure, the flywheel can exhibit a certain damping effect on the vibration of the crankshaft in a normal speed range of an internal combustion engine. However, the flywheel uses numerous parts for the assembly and thus needs an increased number of assembling steps, which inevitably induce costly production of the flywheel.

In view of this, an integral cast flywheel has been proposed by Japanese Patent First Provisional Publication 8-82345, which has the mass portion 1, the flange portion 2 and the plate portion 3 integrally connected to have a monoblock structure. However, due to its inherent construction, even such an integral cast flywheel has failed to satisfy users. In particular, it is difficult to provide the plate portion 3 with both a satisfactory flexibility and a satisfactory fatigue strength.

SUMMARY OF THE INVENTION

It is therefore an object of the present invention to provide an integrally cast flywheel whose plate portion has both a satisfactory flexibility and a satisfactory fatigue strength.

According to a first aspect of the present invention, there is provided an integrally cast flywheel which comprises a circular center flange portion; an annular mass portion concentric with the center flange portion; an annular plate portion concentrically interposed between the center flange portion and the mass portion; and means for defining between the plate portion and the mass portion an annular cavity which has an annular opening directed radially inward, the annular cavity being concentric with the center flange portion.

According to a second aspect of the present invention, there is provided a method of producing an integrally cast flywheel, which comprises the steps of (a) casting a sub-finish product, said sub-finish product having a reinforcing structure installed therewith; (b) applying a certain cutting process to said sub-finish product while pressing the same; and (c) removing said reinforcing structure from said sub-finish product after the cutting process is finished.

BRIEF DESCRIPTION OF THE DRAWINGS

Other objects and advantages of the present invention will become apparent from the following description when taken in conjunction with the accompanying drawings, in which:

FIG. 1 is a sectional view of a half of a flywheel which is a first embodiment of the present invention;

FIG. 2 is a view similar to FIG. 1, but showing a second embodiment of the present invention;

FIGS. 4A and 4B are schematic illustrations of two flywheels depicting respective operations, in which FIG. 4A is a sectional view of one flywheel, whose plate portion has an even thickness therethroughout, and FIG. 4B is a sectional view of the other flywheel, whose plate portion has a thickness which gradually changes as a radial position changes;

FIG. 10 is a view similar to FIG. 8, but showing a sixth embodiment of the present invention;

FIG. 11 is a view similar to FIG. 8, but showing a seventh embodiment of the present invention.

DETAILED DESCRIPTION OF THE EMBODIMENTS

Figure 3:
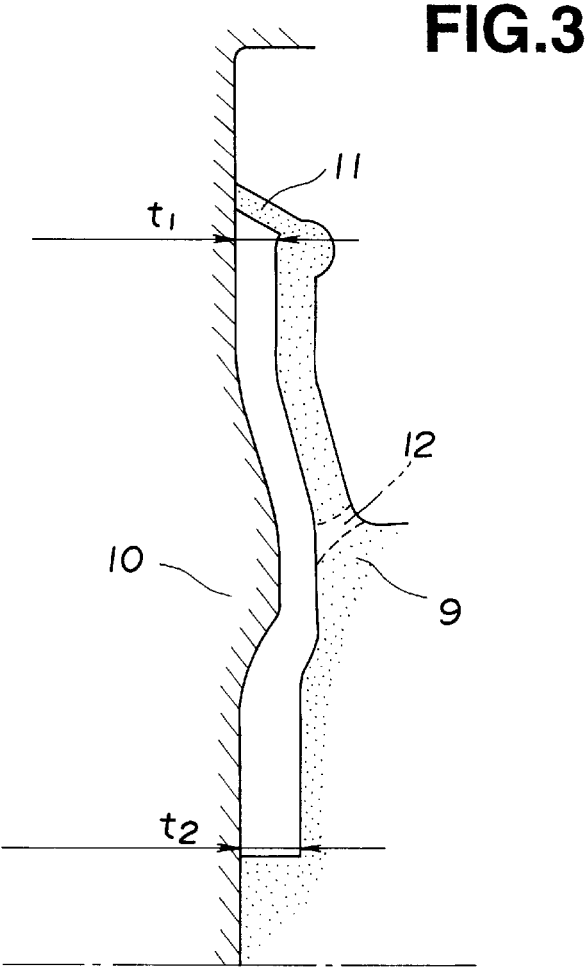
FIG. 3 is a schematically illustrated sectional view of a casting mold by which the flywheel of the second embodiment is cast.

Referring to FIG. 1 of the drawings, there is shown an integral cast flywheel 100A which is a first embodiment of the present invention. For ease of description, in the following, the integral cast flywheel will be referred to as an "integral flywheel". It is to be noted that the word 'integral' signifies 'one-piece formed'.

The integral flywheel 100A comprises an annular mass portion 1 which constitutes a peripheral portion of the flywheel, an annular mounting flange portion 2 which constitutes a center portion of the flywheel, and a resiliently flexible annular plate portion 3 which radially extends between the flange portion 2 and the mass portion 1. That is, the annular plate portion 3 has a radially inside part 3a integrally formed with the center flange portion 2 and has a radially outside part 3b integrally formed with the annular mass portion 1 to constitute a junction zone Z. Of course, the mass portion 1, the flange portion 2 and the plate portion 3 are concentric to one another. The flange portion 2 is coaxially connected to an end of a crankshaft 6 by means of bolts 5. Due to the resilient flexibility of the plate portion 3, the mass portion 1 is permitted to shake in fore-and-aft directions relative to the crankshaft 6.

As shown, the mass portion 1 is arranged just behind a peripheral portion of the plate portion 3 having an annular cavity 7 left therebetween. The annular cavity 7 extends from the junction zone Z a radially outer peripheral part 1c of the annular mass portion 1. Due to the radial extension of annular cavity 7, the radial dimension M of the annular plate portion 3 is substantially increased. The annular cavity 7 is shaped concentric with the flange portion 2 and has an inwardly directed annular opening 7a through which the interior of the cavity 7 is exposed to the outside.

With provision of the annular cavity 7, the plate portion 3 is allowed to have a larger radial dimension, which provides the plate portion 3 with both a satisfied resilient flexibility and a satisfied fatigue strength. That is, in this embodiment, the mass portion 1 can make a larger shaking movement in fore-and-aft directions without having concern about the durability of the plate portion 3 under normal operation of the flywheel. Thus, undesired bending vibration of the crankshaft system applied to the flywheel is effectively damped.

In addition to the above-mentioned advantageous matter, provision of the cavity 7 has further the following advantage. That is, the cavity 7 can serve as a collection chamber for collecting harmful foreign things which would be produced when a flat rear surface 1a of the flywheel starts to make a frictional contact with a clutch driven plate 50 (not shown).

As is understood from the drawing, the outer diameter L3 of the annular plate portion 3 is larger than the inner diameter L1 of the annular mass portion 1. The junction zone Z has a generally reversed U-shaped cross section.

Referring to FIG. 2, there is shown an integral flywheel 100B which is a second embodiment of the present invention, which is a modification of the above-mentioned first embodiment of FIG. 1.

That is, in the second embodiment 100B, a plurality of discharging passages 8 are formed in the flywheel, which extend from a peripheral portion of the annular cavity 7 to a front surface 1b of the mass portion 1 to provide a communication between the interior of the cavity 7 and the outside of the flywheel therethrough. As shown, each passage 8 is so inclined that the distance between the passage 8 and an axis "X" of the crankshaft 6 gradually increases as the passage 8 comes close to the front surface 1b of the mass portion 1. Thus, during rotation of the flywheel, the foreign things which have been collected in the cavity 7 are discharged to the outside through the passage 8 due to a centrifugal force applied to the foreign things. Thus, in this second embodiment, the foreign things are discharged to the outside each time the engine starts, and thus various troubles caused by such foreign things can be eliminated or at least reduced.

FIG. 3 shows schematically a casting mold for casting the integral flywheel 100B of the second embodiment.

The casting mold comprises a main mold 10 and a sand core 9 which is installed in the main mold 10. As shown, the sand core 9 is shaped to correspond to a shaped clearance which consists of the cavity 7 and the passages 8 of the flywheel produced. For the purpose which will become apparent as the description proceeds, the sand core 9 is formed with a plurality of openings 12 at an annular area which corresponds to the inwardly directed annular opening 7a of the flywheel (see FIG. 2).

As is known to those skilled in the art, the vibration damping effect to the crankshaft is largely affected by the rigidity (or spring constant) of the resiliently flexible plate portion 3 of the flywheel. Thus, it is important to precisely control the rigidity of the plate portion 3.

In the casting mold of FIG. 3, the thickness "t" (see FIG. 2) which determines the rigidity of the plate portion 3 is determined by combined heights "t1" and "t2" between the main mold 10 and the sand core 9. Because, for producing the discharging passages 8, the sand core 9 is formed with a plurality of branch portions 11 each having a leading end mated with the main mold 10, the combined height "t1" in the vicinity of each branch portion 11 can be precisely controlled. This brings about accomplishment of the precise control of the rigidity of the plate portion 3 of a flywheel produced through the casting mold.

Figure 4:
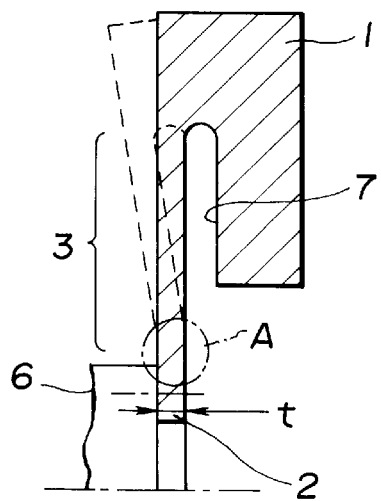
Figure 4:
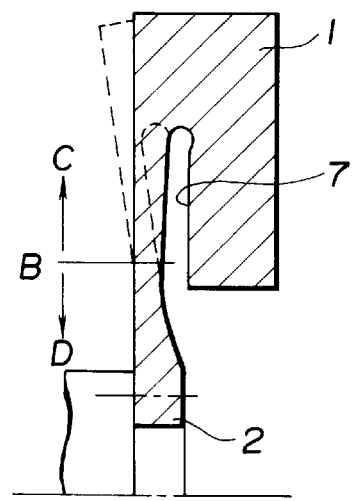

FIGS. 4A and 4B show two integral flywheels under operation. In the flywheel of FIG. 4A, the thickness "t" of the plate portion 3 is even therethroughout. While, in the flywheel of FIG. 4B, the thickness "t" of the plate portion 3 gradually changes with increase of the radial distance from a radially middle position "B" of the plate portion 3, as shown. That is, the thickness "t" gradually increases as a position changes away in a radially outward direction, that is, in the direction of the arrow "C" from the middle position "B", and the thickness "t" gradually increases as a position changes in a radially inward direction, that is, in the direction of the arrow "D" from the middle position "B". More specifically speaking, in the flywheel of FIG. 4B, the plate portion 3 has the thinnest part at the middle position "B" thereof.

In case of the flywheel of FIG. 4A, the resilient deformation of the plate portion 3 tends to concentrate a marked stress at the area "A" where the flange portion 2 and the plate portion 3 are integrally connected. Thus, the portion of the point "A" should be formed to have a sufficient strength. While, in case of the flywheel of FIG. 4B, the concave structure of the plate portion 3 appropriately moderates or reduces such undesired stress concentration. That is, in this case, the resilient deformation of the plate portion 3 is smoothly carried out without having concern about the durability of the same.

Of course, the measure employed in the flywheel of FIG. 4B can be practically applied to the above-mentioned first and second embodiments of FIGS. 1 and 2.

In the following, a method of producing the integral flywheel 100B of the second embodiment of FIG. 2 will be described in detail with reference to FIGS. 3 and 5.

First, the casting mold as shown in FIG. 3 is prepared, and then molten metal is poured into the casting mold. It is to be noted that provision of the openings 12 in the sand core 9 promotes smooth flowing of the molten metal into the casting mold. When the molten metal in the mold is cooled to a certain degree and thus solidified, the casting mold is disassembled in a known manner to remove the metal product. Then, the sand core 9 in the product is scraped out, and a given cutting work is applied to the product.

Figure 5:
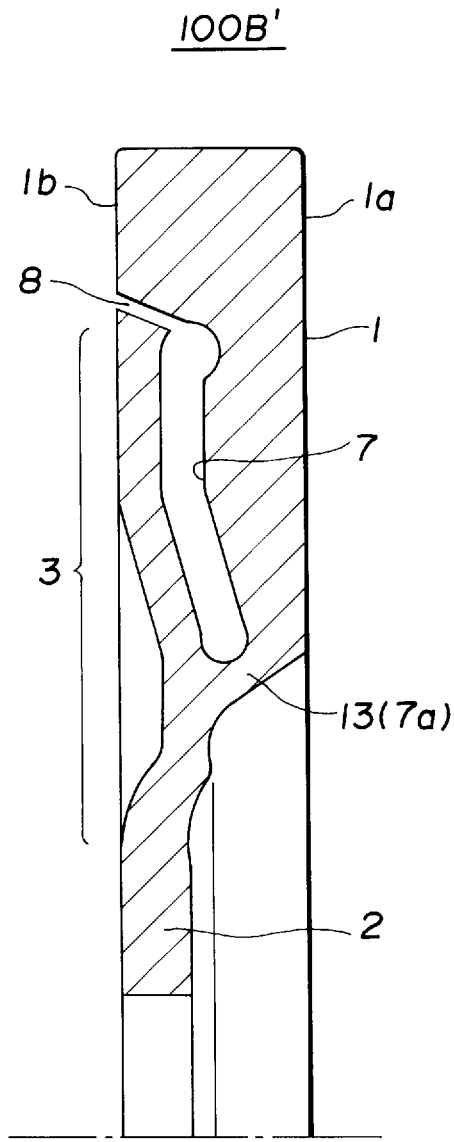
FIG. 5 is a view similar to FIG. 1, but showing a sub-finish product of the flywheel of the second embodiment of FIG. 2.

With these processes, a sub-finish product 100B' as shown in FIG. 5 is provided. In this sub-finish product 100B', in addition to the above-mentioned discharging passages 8, a plurality of bridges 13 are formed by the provision of the openings 12 in the sand core 9, each bridge 13 extending across the inwardly directed annular opening 7a.

It is to be noted that due to existence of the bridges 13, the mechanical strength of the sub-finish product is increased. Thus, application of the given cutting work to the sub-finish product is easily and precisely achieved. That is, each bridge 13 can serve as a reinforcing member.

Figure 6:
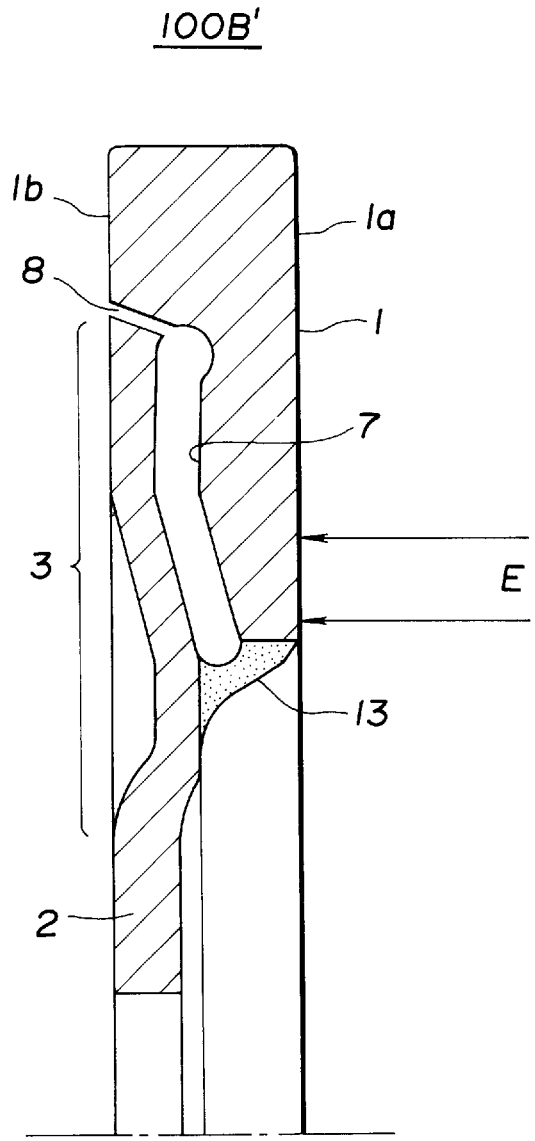
FIG. 6 is a view similar to FIG. 5, but showing a desired feature possessed by the second embodiment.

This advantageous feature will become much clarified when reference is directed to FIG. 6. That is, even when a force "E" produced during the cutting work is applied to the sub-finish product, the mass portion 1 can exhibit a marked stability against deformation thereof. Thus, the cutting work to the rear surface 1a and the front surface 1b of the sub-finish product 100B' is easily and precisely achieved, as has been mentioned hereinabove.

Once the above-mentioned cutting work is finished, all of the bridges 13 are removed in a known manner. With this, the flywheel 100B of the second embodiment of FIG. 2 is produced.

Of course, the flywheel 100A of the first embodiment of FIG. 1 can be produced in substantially same manner.

Figure 7:
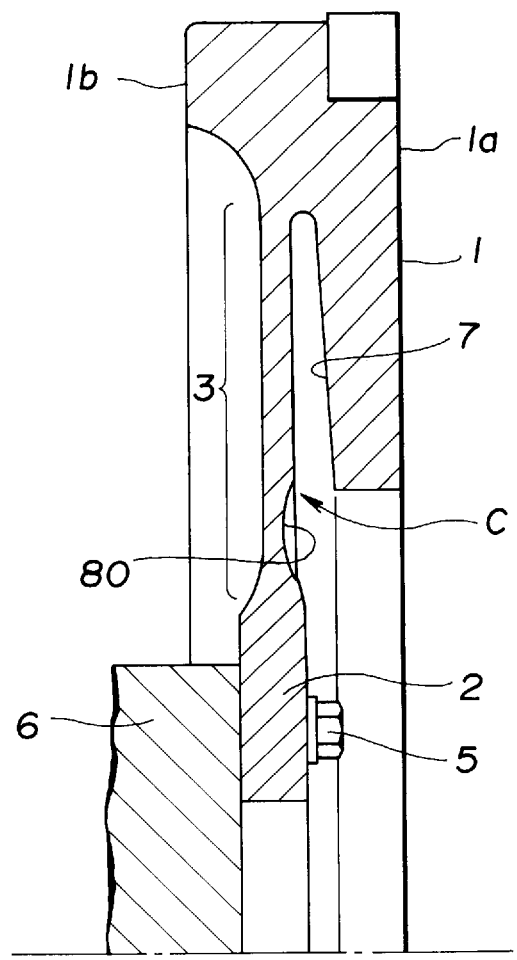
FIG. 7 is a view similar to FIG. 1, but showing a third embodiment of the present invention.

Referring to FIG. 7, there is shown an integral flywheel 100C of a third embodiment of the present invention, which is a modification of the above-mentioned first embodiment of FIG. 1.

In this third embodiment 100C, an annular groove 80 concentric with the flange portion 2 is formed in a naked rough rear surface of the plate portion 3. For producing the annular groove 80, the naked rough rear surface of the plate portion 3, which is constructed of cast metal, is subjected to a cutting process. As shown, the groove 80 has a rounded bottom wall.

Due to provision of the annular groove 80, a marked stress inevitably produced when the plate portion 3 is resiliently flexed is evenly dispersed to an area "C" which extends along the annular groove 80. Thus, durability of the plate portion 3, and thus, that of the flywheel is increased.

Figure 8:
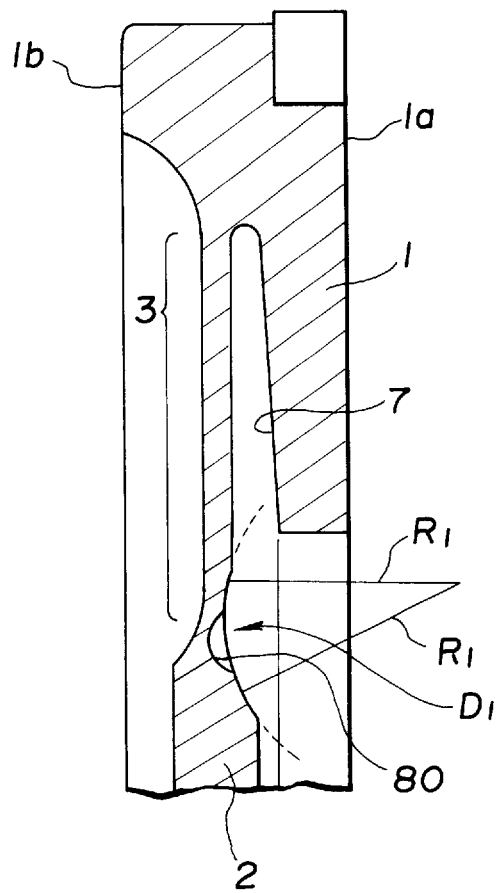
FIG. 8 is a partial sectional view of a flywheel, but showing a fourth embodiment of the present invention.

Referring to FIG. 8, there is shown an integral flywheel 100D of a fourth embodiment of the present invention, which is a modification of the above-mentioned third embodiment.

In this fourth embodiment 100D, the annular groove 80 is located at an area "$D_1$" where the flange portion 2 and the plate portion 3 are integrally connected through a connecting part whose outer surface is smoothly curved and constitutes a part of a circle having a radius of "$R_1$". At the area "$D_1$", the thickness of the plate portion 3 gradually increases as a radial position changes toward the flange portion 2.

Figure 9:
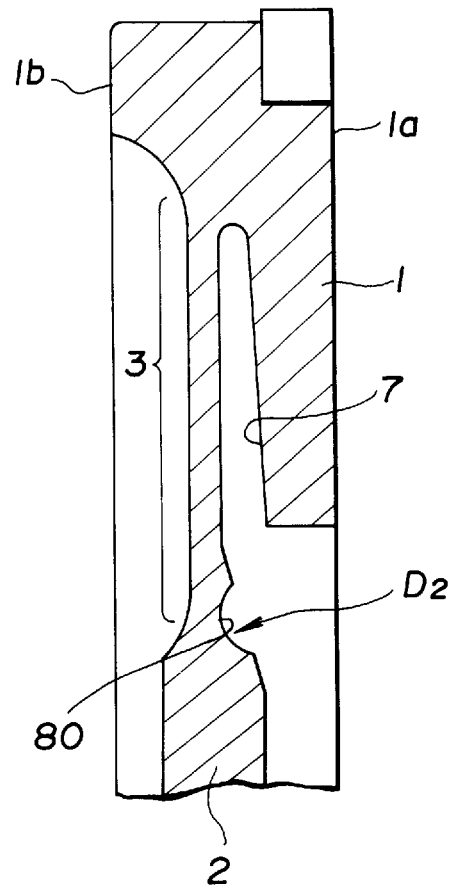
FIG. 9 is a view similar to FIG. 8, but showing a fifth embodiment of the present invention.
Figure 12:
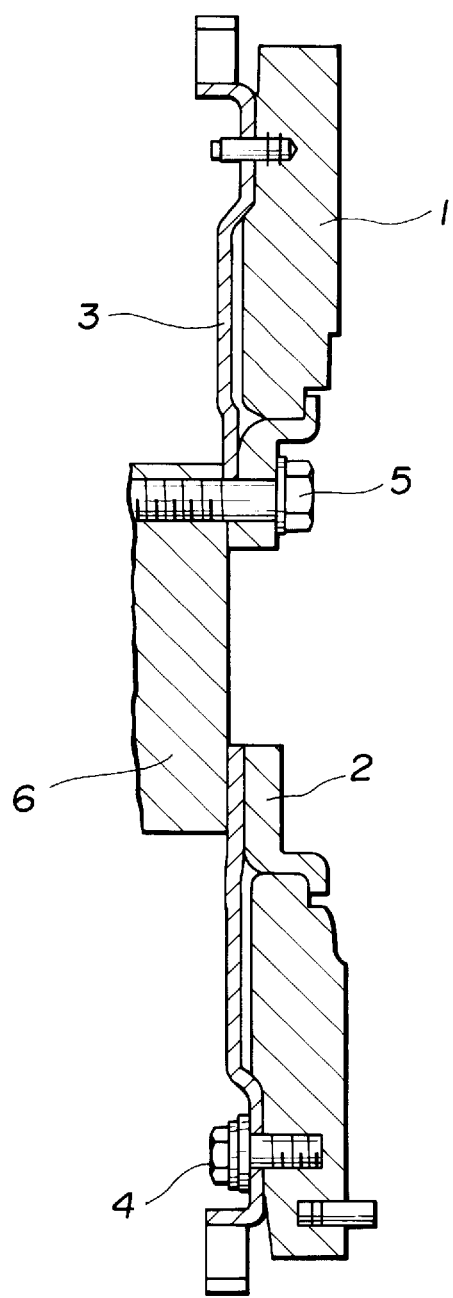
FIG. 12 is a sectional view of a conventional flywheel.

Referring to FIG. 9, there is shown an integral flywheel 100E of a fifth embodiment of the present invention, which is also a modification of the above-mentioned third embodiment of FIG. 7.

In this fifth embodiment 100E, the annular groove 80 is located at an area "$D_2$" where the flange portion 2 and the plate portion 3 are integrally connected through a connecting part whose outer surface is flat and inclined relative to the rear surfaces of the plate and flange portions 3 and 2. At the area "$D_2$", the thickness of the plate portion 3 gradually increases as a radial position changes toward the flange portion 2.

Referring to FIG. 10, there is shown an integral flywheel 100F of a sixth embodiment of the present invention, which is also a modification of the third embodiment of FIG. 7.

In this sixth embodiment 100F, the annular groove 80 is so formed that the depth "$h_1$" of a radially outer side thereof is equal to or smaller than the depth "$h_2$" of a radially inner side thereof. That is, in the sixth embodiment, "$h_1 \leq h_2$" is established. In other words, when taking the section of the annular groove 80 into consideration, the radius "$r_1$" of curvature of the outer side is equal to or greater than the radius "$r_2$" of curvature of the inner side. That is, "$r1 \geq r2$" is established. More specifically, the deepest part of the annular groove 80 is placed nearer an inner bank of the groove 8 than an outer bank of the same. With this measure, undesired stress concentration at the naked rear surface zone "E" of the plate portion 3 can be reduced.

Referring to FIG. 11, there is shown an integral flywheel 100G of a seventh embodiment of the present invention, which is also a modification of the third embodiment of FIG. 7.

In this seventh embodiment 100G, three, that is, outer, center and inner concentric annular grooves 8a, 8b, and 8c are formed in the naked rough rear surface of the plate portion 3 near the flange portion 2, each having a depth "$h_1$", "$h_2$" or "$h_3$", as shown. "$h1 \leq h2 \leq h3$" is established. In other words, when taking the section of each annular groove 80a, 80b or 80c into consideration, the radius "$r_1$" of curvature of the outer annular groove 80a is equal to or greater than the radius "$r_2$" of curvature of the center annular groove 80b which is equal to or greater than the radius "$r_3$" of curvature of the inner annular groove 80c. That is, "$r1 \geq r2 \geq r3$" is established. With this measure, undesired stress concentration at the naked rear surface zone "E" of the plate portion 3 can be reduced, like in the case of the above-mentioned sixth 30 embodiment 100F.

Of course, in the seventh embodiment 100G, more than three annular grooves may be employed.

In the following, various advantages possessed by the above-mentioned embodiments will be described.

Because of provision of the annular cavity 7, the plate portion 3 of the integral flywheel can have a larger radial dimension. This provides the plate portion 3 with both a satisfied resilient flexibility and a satisfied fatigue strength.

Due to provision of the annular cavity 7 which contains air which is a heat insulating material, heat transmission from the mass portion 1 to the crankshaft 6 is reduced. In fact, a marked heat is produced when the flat rear face 1a of the mass portion 1 makes a frictional engagement with a clutch (not shown). Furthermore, due to provision of the annular cavity 7, the entire surface area of the flywheel is increased, which promotes a smoothed heat dissipation from the flywheel.

The annular cavity 7 serves as a collection chamber which collects harmful foreign things which would be produced when the flat rear surface face 1a of the flywheel frictionally contacts the clutch.

In case of the second embodiment of FIG. 2, the foreign things in the cavity 7 can be discharged to the outside through the discharge passages 8 when the flywheel is rotated. Thus, various troubles caused by such foreign things can be more effectively reduced.

In the flywheel of FIG. 4B, the unique construction of the plate portion 3 can appropriately moderate or reduce undesired stress concentration.

In the method according to the invention, a sub-finish product 100B' having a robust structure is positively produced for having a precise cutting work applied thereto. That is, the cutting work can be easily and precisely applied to such robust structure. Once the cutting work is finished, the bridges 13 which have provided the sub-finish product 100B' with the robust structure are removed.

In the method, due to provision of the openings 12 in the sand core 9 (see FIG. 3), smooth flowing of a molten metal into the casting mold is achieved.

In case of the third to seventh embodiments 100C to 100G, annular groove or annular grooves are formed in the naked rough rear surface of the plate portion 3. Due to provision of such annular grooves, a marked stress inevitably produced when the plate portion 3 is resiliently flexed is evenly dispersed, as has been described hereinabove. Thus, durability of the flywheels 100C to 100G against the fatigue is much increased.

What is claimed is:

1. An integral cast flywheel comprising:

a circular center flange portion;

an annular mass portion concentric with said center flange portion, said annular mass portion being radially outwardly spaced from said center flange portion;

an annular plate portion extending radially outwardly from said center flange portion and having an outer periphery which is integral with said annular mass portion to constitute a function zone; and an annular cavity extending from said junction zone radially outwardly to an outer periphery of said annular mass portion to provide an increased surface area of the flywheel, and having an annular opening directed radially inward, said annular cavity being concentric with said center flange portion.

2. An integral cast flywheel as claimed in claim 1, wherein said annular cavity is constructed and sized to provide said annular plate portion with a resilient flexibility.

3. An integral cast flywheel as claimed in claim 1, wherein a thickness of said annular plate portion varies with a change of distance from a center of said center flange portion.

4. An integral cast flywheel as claimed in claim 3, wherein a thickness of said annular plate portion is a smallest value at a radially middle portion of the annular plate portion.

5. An integral cast flywheel as claimed in claim 1, further comprising means for defining, in either one of said mass portion and said plate portion, passages through which an interior of said annular cavity is communicated with an exterior of the flywheel.

6. An integral cast flywheel as claimed in claim 5, wherein each of said passages is inclined with respect to an axis of said center flange portion and extends from a radially outermost part of said annular cavity to a front surface of said annular mass portion.

7. An integral cast flywheel as claimed in claim 6, wherein each passage is inclined such that the distance between each passage and the axis of said center flange portion gradually increases as the passage comes closer to the front surface of said annular mass portion.

8. An integral cast flywheel as claimed in claim 1, wherein said annular plate portion is formed at a rear surface thereof with at least one annular groove which is concentric with said center flange portion.

9. An integral cast flywheel as claimed in claim 8, wherein said annular groove is provided in the rear surface of said plate portion.

10. An integral cast flywheel as claimed in claim 8, wherein said annular groove has a rounded bottom wall.

11. An integral cast flywheel as claimed in claim 10, wherein said annular groove is provided an area where the flange portion and the plate portion are integrally connected through a connecting part whose outer surface is smoothly curved.

12. An integral cast flywheel as claimed in claim 11, wherein the smoothly curved outer surface of said connecting part is shaped as a section of a circle.

13. An integral cast flywheel as claimed in claim 10, wherein said annular groove is located at an area where the flange portion and the plate portion are integrally connected through a connecting part whose outer surface is flat and inclined relative to rear surfaces of said plate and flange portions.

14. An integral cast flywheel as claimed in claim 10, wherein the deepest part of said annular groove is placed nearer an inner bank of said groove than an outer bank of said annular groove.

15. An integral cast flywheel as claimed in claim 8, wherein said annular plate portion is formed at the rear surface thereof with a plurality of annular grooves which are concentric with said center flange portion.

16. An integral cast flywheel as claimed in claim 15, wherein the depth of any selected one of the annular grooves is smaller than that of another annular groove located inside of the selected annular groove.

17. An integral cast flywheel as claimed in claim 1, wherein said annular mass portion has, at a side opposite to said annular cavity, a surface adapted to frictionally contact a clutch driven plate.

18. An integral cast flywheel comprising:

a circular center flange portion;

an annular mass portion concentric with said center flange portion, said annular mass portion being radially outwardly spaced from said center flange portion;

an annular plate portion extending radially outwardly from said center flange portion and having an outer periphery which is integral with said annular mass portion to constitute a junction zone; and an annular cavity extending from said junction zone radially outwardly to an outer periphery of said annular mass portion to provide an increased surface area of the flywheel, and having an annular opening directed radially inward, said annular cavity being concentric with said center flange portion, wherein a thickness of said annular plate portion is smaller than a thickness of said annular mass portion, wherein an outer diameter of said annular plate portion is larger than an inner diameter of said annular mass portion, and wherein said junction portion has a reversed U-shaped cross section surrounding the annular cavity.

* * * * *